April 23, 1929.  V. C. McCRORY  1,710,586
GRIDDLE
Filed Jan. 3, 1927
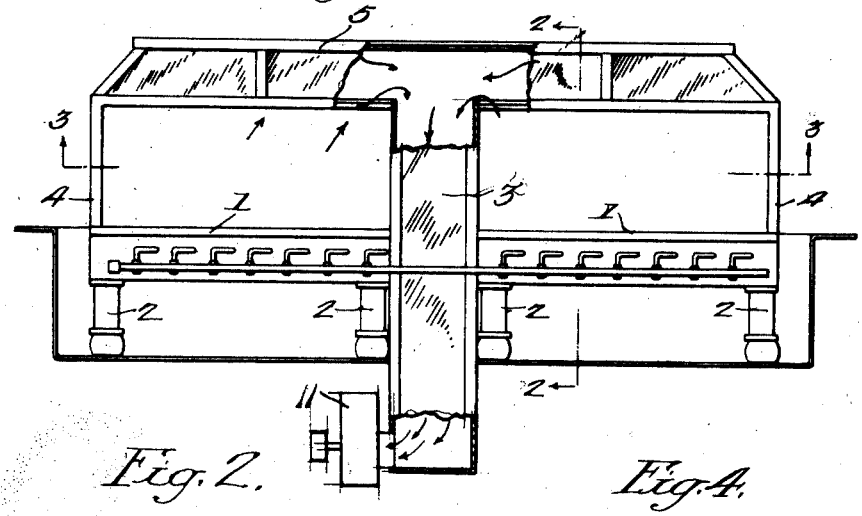
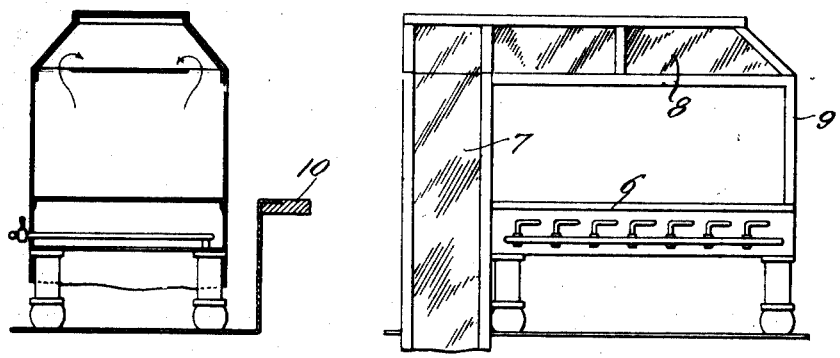
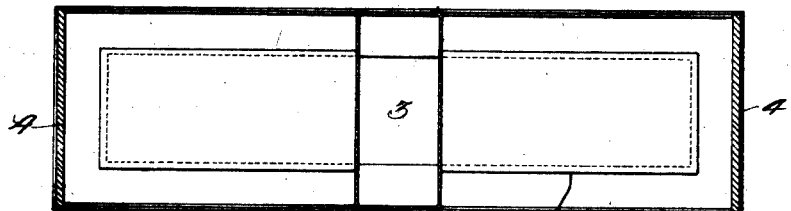
Inventor:
Van C. McCrory,
by his Attorneys
Howson & Howson Patented Apr. 23, 1929.

1,710,586

UNITED STATES PATENT OFFICE.

VAN C. McCRORY, OF LEONIA, NEW JERSEY, ASSIGNOR TO McCRORY STORES CORPORATION, OF NEW YORK, N. Y., A CORPORATION OF DELAWARE.

GRIDDLE.

Application filed January 3, 1927. Serial No. 158,655.

This invention relates to improvements in griddles and the like of the type employed in stores and other enclosed spaces.

The principal object of the invention is to provide a griddle or stove of novel form providing for collection and removal of the fumes and smoke arising from the cooking materials.

A further object of the invention is to provide a novel form of hooded griddle or stove in which the hood, effective to collect the fumes, is so constructed as not to obstruct the view of the cooking surface from either side thereof.

Another object of the invention is to provide a compact form of fume-collecting hood including a flue associated with said hood for conducting the fumes therefrom.

In the attached drawings:

Figure 1 is a front elevation of a griddle made in accordance with my invention;

Fig. 2 is a section on the line 2—2, Fig. 1;

Fig. 3 is a section on the line 3—3, Fig. 1, and

Fig. 4 is a front elevation of a modified form of griddle.

As illustrated in Fig. 1, the griddle or cooking surface 1 is supported upon pedestals 2 and is divided by a central flue or duct 3 which is enclosed on all sides and projects upwardly between the sections of the griddle. Supported in part by the flue 3 and partly by end partitions 4, 4 at the outer ends of the griddle sections is a hood 5 which extends completely over the effective griddle areas and at their adjacent ends communicate directly with the top of the flue 3 which opens into the hood. It will be noted that the two sections of the griddle are entirely open front and rear and are therefore visible from either side.

In Fig. 4, I have illustrated a modification in which the griddle comprises a single cooking section 6 having at one end a flue 7 similar to that described above extending upwardly above the griddle surface to communicate at the top with the interior of a hood 8 which completely covers the griddle 6 which is supported at one end by the duct 7 and at the other end by an end partition 9.

In practice, the griddle may be mounted longitudinally of and immediately behind a counter 10. The customer accordingly has a free and unobstructed view of the food cooking on the griddle, and at the same time the griddle is readily accessible from the other side to the operator. The customer, however, is entirely free from the annoyance of objectionable fumes by reason of the arrangement of the hood and flue 3, which respectively collect and withdraw the fumes arising from the griddle, the flue being connected to a suitable blower or fan 11, or other suction means, which draws the fumes from the hood.

I claim:

1. A griddle comprising a cooking surface open front and rear and having end walls extending above said surface, and a fume-collecting hood supported by said walls above the cooking surface, one of said walls being hollow to form a flue terminating at the top in said hood and extending downwardly below the cooking surface.

2. A griddle comprising a pair of cooking surfaces open front and rear and arranged end to end, an independent wall at each end of both of said cooking surfaces and extending above said surfaces, the said walls at the adjacent ends of said cooking surfaces being spaced apart, panels at the front and rear of said griddle enclosing the space between said adjacent end walls, a fume-collecting hood supported by said walls and extending continuously over both cooking surfaces, the said enclosed space between the cooking surfaces opening at the top into the hood and constituting a fume-evacuating flue extending downwardly below the cooking surface.

VAN C. McCRORY.